United States Patent [19]

Linde

[11] 4,373,180

[45] Feb. 8, 1983

[54] MICROPROGRAMMED CONTROL SYSTEM CAPABLE OF PIPELINING EVEN WHEN EXECUTING A CONDITIONAL BRANCH INSTRUCTION

[75] Inventor: James P. Linde, Lafayette Hill, Pa.

[73] Assignee: Sperry Corporation, New York, N.Y.

[21] Appl. No.: 167,072

[22] Filed: Jul. 9, 1980

[51] Int. Cl.³ .......................... G06F 9/28; G06F 9/38
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,418,638 | 12/1968 | Anderson et al. | 364/200 |
| 3,689,895 | 9/1972 | Kitamura | 364/200 |
| 3,736,567 | 5/1973 | Lotan et al. | 364/200 |
| 3,793,631 | 2/1974 | Silverstein et al. | 364/200 |
| 4,075,687 | 2/1978 | Nissen et al. | 364/200 |
| 4,110,822 | 8/1978 | Porter et al. | 364/200 |
| 4,156,925 | 5/1979 | Tutt et al. | 364/900 |
| 4,200,927 | 4/1980 | Hughes et al. | 364/200 |
| 4,210,960 | 7/1980 | Borgerson et al. | 364/200 |

Primary Examiner—Gareth D. Shaw
Assistant Examiner—Stephen A. Soffen
Attorney, Agent, or Firm—James R. Bell; Marshall M. Truex

[57] ABSTRACT

A microprogrammed control system capable of overlapping the fetch and execution of microinstructions even when a conditional jump microinstruction is being executed. The control system comprises a pipeline register for storing the microinstruction currently being executed. The system also includes address circuitry for forming an "ordinary address" which is one greater than the address of the microinstruction in the pipeline register and for forming at least one "jump address" of a microinstruction occurring elsewhere in the program. A conditional jump microinstruction identifies a jump address for the microinstruction to be executed next, which jump address is only valid after the condition identified by the conditional jump instruction is tested and indicates that the jump address is to be used. Otherwise, the next microinstruction has an ordinary address. Selection circuitry cooperates with at least one bit signal transmitted from the anticipated condition field in the conditional jump instruction to anticipate the result of testing the condition specified and selects an address from the address circuitry for transmission to the control store memory before testing of the specified condition is complete. The selection circuitry comprises correction circuitry which changes the selection of the address of the next microinstruction to be executed when the anticipated test result and the actual test result do not agree. When this occurs, the selection circuitry extends the cycle time of the control system to allow for correction.

2 Claims, 3 Drawing Figures

MICROPROGRAMMED CONTROL SYSTEM CAPABLE OF PIPELINING EVEN WHEN EXECUTING A CONDITIONAL BRANCH INSTRUCTION

BACKGROUND OF THE INVENTION

The present invention relates to a means for improving the performance in a pipeline microprocessor and in particular wherein the microprocessor deals with conditional branch microinstructions.

In previous hardwired computers, selection of control signals required for executing each instruction, of an instruction set, stored in the computer main memory was fixed by the design of decoders and encoders within the computer. With microprocessing, however, a separate control store memory (COS) stores a set of microinstructions (a microprogram) for executing each of the instructions in main memory (called a macroinstruction), and each microinstruction comprises a plurality of bits. Each bit position within a microinstruction can be used to generate directly a control signal. However, most microprocessors use coded fields of bits which transmit bit signals to a decoder and the output signals from the decoder generate the control signals.

A complete cycle of a microprocessor generally comprises the fetching of a microinstruction and the execution thereof. In the prior art, to minimize the cycle time and speed up the processing in the microprocessor, designs of microprocessors have included the overlapping of fetch and execution operations.

This is accomplished in the prior art by providing a pipeline register between the COS and the instruction execution unit of the microprocessor. Such an arrangement allows the microprocessor to fetch the next required microinstruction and get it ready in the COS while a current microinstruction, stored in the pipeline register, is being executed.

However, even in a pipeline register design, a problem occurs if the results of the execution of the current microinstruction are required to determine the address of the next microinstruction. For example, where the microprogram includes conditional jump or branch microinstructions, it has been necessary to wait until a condition specified in the conditional microinstruction becomes valid in order that the condition might be tested. If the test result is true then the next address (from which the next microinstruction is brought) is determined from information in the current microinstruction. On the other hand if the test result is false the next address activated will be determined by incrementing the address of the current instruction.

Typically, the COS is of the random-access-memory (RAM) type. The access time of a particular microinstruction at a selected address within the COS is quite often a large percentage of the overall cycle time of the microprocessor. Therefore, it would be desirable to begin fetching a microinstruction before the execution of the current microinstruction in the pipeline register is completed. As mentioned above in the prior art it has been necessary to wait until the condition of the microprocessor is tested before determining whether or not the jump address, identified in a conditional jump microinstruction, is to be employed. Accordingly it has not been the practice to access the next microinstruction in the RAM (since the test results must first be determined) before the end of the microprocessor cycle. In the prior art, even in a pipeline register approach, problems arise in trying to overlap the fetch and execution of microinstructions when the current microinstruction being executed is a conditional jump microinstruction.

U.S. Pat. No. 3,418,638, issued to D. W. Anderson et al, relates to devices in a data processing machine for prefetching and predecoding of succeeding instructions to enable implementation of a "branch on condition subsequent instruction" at the highest possible speed, and with a minimum of delay in data processing.

The Anderson et al patent discloses a loop mode which is a condition of the instruction set unit (labeled I box in the patent). The I box is in a loop mode whenever the instructions stacked in a buffer (Buffer 156 in the patent) contain the entire loop. The system described in the patent is designed so that, if the I box is in loop mode, the system assumes that a conditional branch will be required. If the I box is not in loop mode then the system assumes that the next sequential instruction should be fetched and executed. In this Anderson et al patent description the program path for conditional branch instructions is determined by the hardware. The loop mode disclosed in this patent can not provide for random branching on conditional branch instructions located in a COS.

SUMMARY OF THE IVENTION

The present invention relates to a microprocessor system having a control store memory (COS) for storing a microprogram consisting of a plurality of instructions. The microinstruction currently being executed is stored in a pipeline register, while the microinstruction to be next executed is fetched from the COS after its address has been obtained from an address circuitry means and made ready for transfer to the COS.

In accordance with the description of this system an "ordinary address" is formed by adding a "one" (1) to the address of the microinstruction currently being executed. When a series of microinstructions is to be executed according to a numerical order, each succeeding microinstruction to be executed will have an ordinary address, i.e. its address will be increased by one over the address of the preceeding microinstruction. However, a series of microinstructions need not be executed in numerical order in which case the address of a succeeding microinstruction does not have to be the next sequential number as related to the address of the microinstruction currently being executed. In the last set of circumstances, the succeeding address is described as a jump address or a conditional address.

Normally, a program will forego seeking an ordinary address in favor of a jump address when some condition in the execution of the program has been met. For example, in a payroll program when calculating an employee's salary, the program must be arranged to determine when the employee's "year-to-date" salary exceeds the social security taxable limit. In other words, if a social security tax is levied on the first $20,000 earned, then when the employee has earned in excess of $20,000 a different routine (jump to a new routine) is followed in computing the employee's salary. The condition to be tested in this example is whether or not the employee's year-to-date salary exceeds $20,000. A conditonal address microinstruction identifies the condition to be tested by certain information within the microinstruction.

The present system anticipates the results of testing for the condition and selects an address, either a jump address or an ordinary address, based on that anticipation. If the actual test of the condition proves that the anticipation was incorrect, then the microinstruction selected in response to the anticipation is rendered inactive and some other address is selected to fetch the proper instruction. As will be explained below, the new instruction is fetched during the same cycle that the rejected instruction was fetched and this is accomplished by extending the execution cycle.

In the present system when a conditional jump microinstruction is present in the pipeline register, selection circuitry means selects an address for the next instruction from the address circuitry means. The selected address signals are transmitted to a COS even before the condition to be tested can possibly be tested. The selection circuitry means operates in response to at least one bit signal transmitted from an anticipated condition field within the conditional jump microinstruction in the pipeline register. If the anticipated condition field indicates unequivocally that the next instruction will have an ordinary address then the selection circuitry selects an ordinary address from the address circuitry. If it indicates that the next address should be a jump address then the system will provide signals to select one of a plurality of possible jump addresses. If, however, the later testing of a condition of the control system specified by the conditional jump microinstruction indicates that the wrong address was anticipated and fetched, a correction circuitry portion of the selection circuitry means changes the selection of the address of the next microinstruction to be executed and the new microinstruction is fetched. At the same time the microprocessor cycle is extended.

The objects, features and advantages of the present invention will become more fully apparent from the following detailed description of the preferred embodiment, the appended claims, and the accompanying drawings in which:

DETAILED DESCRIPTION OF THE DRAWINGS

Figure 1:
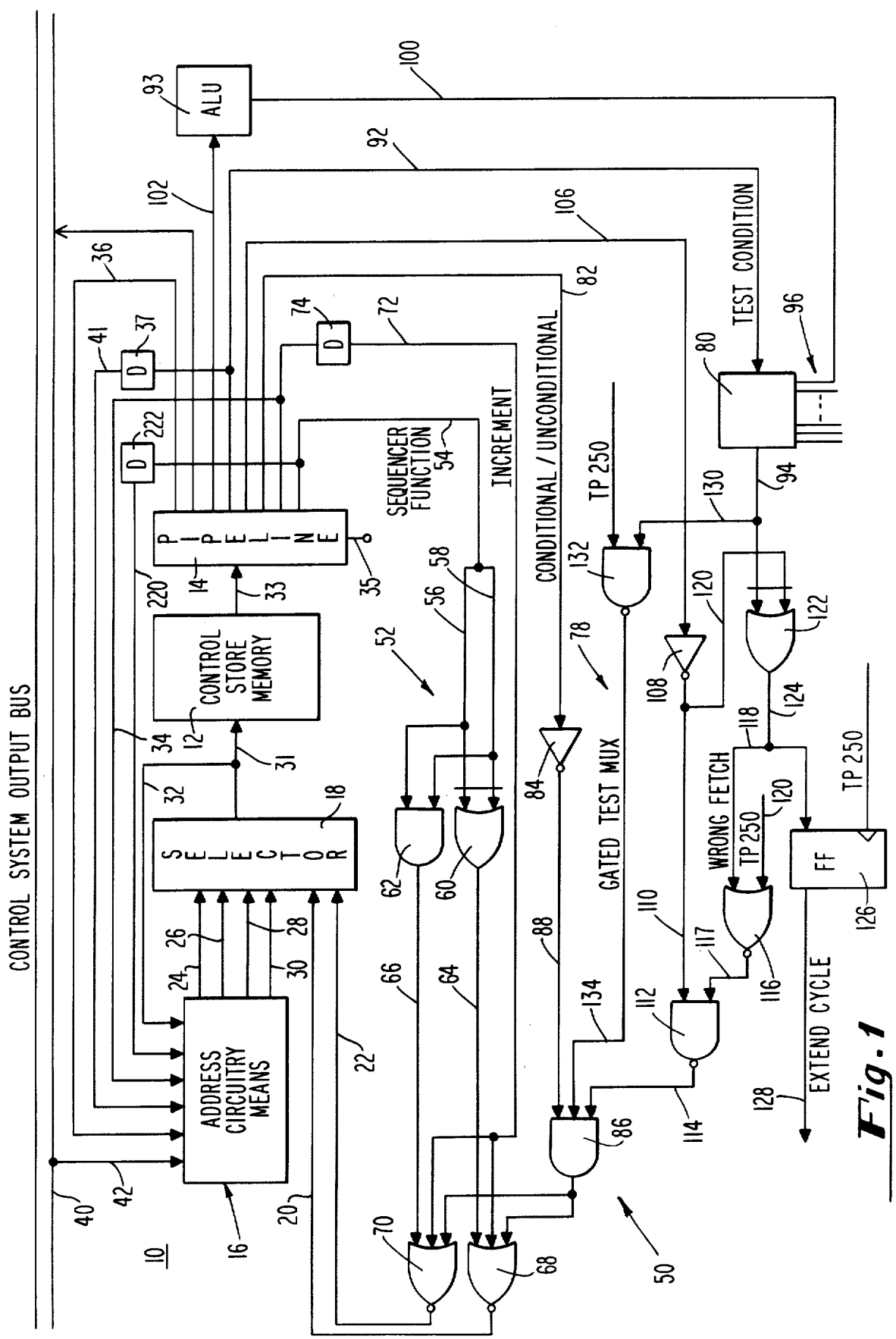
FIG. 1 is a block diagram of a portion of the preferred embodiment microprogram control system incorporating the present invention.

FIG. 1 is a block diagram of a portion of a microprogram control system designated generally 10. It comprises a control store memory (COS) 12, which stores a microprogram having a plurality of microinstructions. The COS in the preferred embodiment comprises four (4) sixteen-by-four bit Intel 2114 random access memories (RAM). Each microinstruction comprises a plurality of bits and, in the preferred embodiment, there are fifty-six bits in a microinstruction. However, more or less bits could be utilized in a microinstruction without affecting the performance of the present invention.

When a microinstruction is selected for execution from the COS it is transferred to a pipeline register 14, where it is stored during execution. The cycle time for the system starts when the instruction is transferred into the pipeline register. Execution of a microinstruction is performed by the portions of the microprogram control unit coupled to the COS, most of which are not shown in FIG. 1, and which form no part of the present invention. In the present microprogram control system, bits in the microinstruction are used to generate control signals necessary for operation of the control system. The bit signals may be used directly to formulate control signals, or some bit signals may be taken together as a coded combination to cooperate with attached decoding circuitry for generation of a plurality of control signals. Pipeline register means 14 is, in the preferred embodiment, a 74S175 device.

If we examine FIG. 1, we find that there is an address circuitry means 16 which is described in more detail in connection with the description of FIG. 2. The address circuitry means 16 forms at least four possible addresses. Actually the address circuitry means 16 could be designed to form more than four possible addresses and still would operate within the spirit of the present invention. The addresses which are made up of a plurality of bit signals are transmitted on the cables 24, 26, 28 and 30, to the selector device 18. It should be borne in mind that the lines 24, 26, 28 and 30, actually represent a plurality of lines or a cable. In the selector 18 one of the four addresses on the cables 24, 26, 28 and 30 is selected by the bit signals on lines 20 and 22. When one of the four addresses is selected it is transmitted on the cable 31 to the control store memory 12 whereat it selects an instruction from memory. From the time that the address signals are transmitted on line 31 to the COS 12, it takes approximately 200 nanoseconds for the microinstruction information signals to be present, in stable form, at the output of the COS. It should be noted that the time at which the microinstruction information signals are stable is approximately 250 ns from the beginning of the execution cycle. However the output of the COS 12 is not accepted by the pipeline register 14 through the cable 33 until the end of the execution cycle (which takes 350 ns or 100 ns after the stabilization of the COS) or the beginning of the next cycle. This is controlled by a gating signal on line 35 which is controlled by a clock pulse generator the necessity of which is not present in the description of this invention. It is the control of the signals on lines 20 and 22 and the hardware required to control those signals that constitutes the present invention.

The address of the next microinstruction to be executed (after the microinstruction currently in the pipeline register means 14 has been executed) is formed in address circuitry means 16. As can be gleaned from FIG. 1, the addresses formed by address circuitry means 16, in the preferred embodiment are formed: in response to bit signals received from a displacement field or a branch address field in a jump microinstruction, stored in pipeline register 14, via lines 34 and 36; from bit signals received from a sequencer function field over line 41 and decoded by decoder 37; from bit signals received from a control system output bus 40 via line 42; and from the previously transmitted address from selector 18 over line 32.

Figure 3:
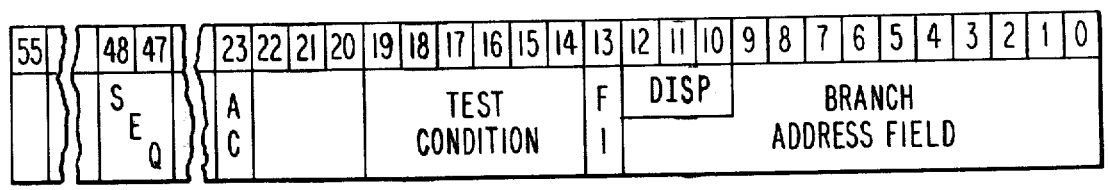
FIG. 3 is a bit field representation of a portion of the preferred microinstruction format used in the present invention.

Circuitry means designated generally 50 is shown connected between pipeline register 14 and selector 18 for generating the selection control signals which appear on 20 and 22. As mentioned earlier it is the selection control signals on lines 20 and 22 which choose which one of the addresses on lines 24, 26, 28 and 30 is to be transmitted to the COS 12. The circuitry means 50 operates in response to various bit signals transmitted from the fields within a microinstruction stored in pipeline register means 14. FIG. 3 shows these fields in a schematic representation of a portion of the microinstruction of the preferred embodiment of the invention.

Referring to FIG. 3, the various fields used by circuitry means 50 are found. Bits 10, 11, and 12, identified as displacement field bits (DISP) which determine whether or not the programmer has asked that the next address be simply incremented. If all of the DISP bits are zero or low then the system, as will become clear hereinafter, will generate an increment signal.

Bit 13, labeled F1, identifies whether the microinstruction stored in the pipeline register 14 is a conditional or an unconditional instruction. It should be understood that an unconditional microinstruction may include a jump address for the next instruction.

Bits 14 through 19 are the test condition field bits. These bits by their combination identify which one of a plurality of conditions is to be tested to determine whether an ordinary address microinstruction or a jump address microinstruction is to be selected. The test condition bits are effective only when a conditional jump microinstruction is present in the pipeline register means 14.

Bit 23, is the anticipated condition field bit, which allows circuitry means 50 to anticipate the result of testing of a selected condition so that the fetching and execution of two different microinstructions can be overlapped, even though the test condition has not been tested.

Bits 47 and 48, labeled SEQ, meaning sequence function bits, are the bits which identify which of a plurality of jump addresses formed by the address circuitry means 16 is to be selected when a jump address is desired.

If the instruction in the pipeline register has bits 10, 11 and 12 (the DISP bits) indicating all zeros then there will result three low signals which are decoded at decoder 74 to provide a high signal on line 72 to the two NOR gates 68 and 70. The NOR gates 68 and 70 respond to positive input signals to provide negative output signals. Accordingly there will be a low signal on line 20 and on line 22. Low signals on lines 20 and 22 cause the selector 18 to select the address on line 24 which is the ordinary address line. It should be understood that if the microinstruction in the pipeline register 14 includes three ZERO bits, as the DISP bits, then the increment signal generated in response thereto overrides any other possible address selection signals generated in the circuitry shown in FIG. 1.

Sequencer function circuitry designated generally 52 responds to the two bit signals from bits 47 and 48 of FIG. 3 transmitted on the cable 54 and thereafter individually on the two lines 56 and 58. The sequencer function bit signals over lines 56 and 58 are transmitted to exclusive OR gate 60 and AND gate 62. The output of exclusive OR gate 60 is furnished over line 64 to NOR gate 68, while the output from AND gate 62 is furnished over line 66 to NOR gate 70. If the logic circuitry is considered it will be recognized that if the bits 47 and 48 were both ONES (thereby providing two high signals) then there would result a zero on line 22 and a ONE on line 20. A pair of zeros found in the bits 47 and 48 would result in a ONE on line 22 and a ONE on line 20. Whereas a ONE-ZERO or a ZERO-ONE combination for bits 47 and 48 would result in a ONE on line 22 and a ZERO on line 20. Hence the different bit combinations possibly found in bits 47 and 48 result in respectively three different bit combinations on lines 20 and 22 and hence provide a basis for selecting one of the three addresses on lines 26 and 28 and 30. Bear in mind that a pair of high signals on NOR gates 68 and 70 will override any signals generated by the sequencer function circuitry 52.

Let us consider what happens when the bit 13 in FIG. 3 is a ZERO indicating that there is a conditional jump transfer possibility. In such an instruction the sequencer field 47 and 48 would have one of the combinations mentioned earlier and the six bits 14 through 19 would have some combination which would indicate the test condition to be examined. The position 23, AC, would have a ONE or a ZERO depending upon whether the programmer anticipated, in our hypothetical instruction, that the system should seek an ordinary address for the next instruction or a jump address for the next instruction. The DISP bits would be something other than all ZEROS because we would not be seeking to increment unconditionally. In accordance with our above described instruction there would be a pair of signals generated on lines 64 and 66 in accordance with the two bits found in the sequencer field and those two signals, if not overridden at OR gates 68 and 70, will determine the selection of one of the addresses on lines 26, 28 and 30. The question next becomes whether or not the signals on lines 64 and 66 generated by the sequencer field information will be overridden by selection circuitry means designated generally 78 responding to information from the anticipated field of the microinstruction which information has been programmed therein. Since the hypothetical instruction is a conditional microinstruction, there will be a ZERO, or low signal, on line 82 which will be inverted by the inverter 84 to provide a high signal to AND gate 86. If we understand that the TP 250 signal is low for the first 250 nanoseconds then both NAND gates 132 and 116 will provide high output signals for the first 250 nanoseconds. The high output signal from the NAND gate 132 provides a second high input signal to AND gate 86. The high output signal on line 117 partially conditions NAND gate 112 and the output from NAND gate 112 in our present situation will determine whether or not AND gate 86 produces an override signal to NOR gates 68 and 70. Accordingly it becomes apparent that the anticipated condition signal on line 106 becomes controlling for this first decision. If the programmer anticipates that a jump address will be required then the signal on line 106 will be low thereby providing a second high signal, from inverter 108, to AND gate 112. Two high signals to NAND gate 112 provide a low signal therefrom to render the AND gate 86 not fully conditioned and hence the signals on lines 64 and 66 are not overridden and thus these signals determine the selection of the address. On the other hand if the programmer had anticipated that an ordinary address would be required for the next instruction then the signal on line 106 would have been high providing a low signal from inverter 108 to render the NAND gate 112 not fully conditioned. Accordingly there would be a high signal on line 114 providing the third high signal to the AND gate 86 and thus there would be a high signal sent to each of the NOR gates 68 and 70. The last mentioned high signals would provide low signals on the lines 20 and 22 which would result in the selection of the ordinary address on line 24. It becomes apparent then that even though there is always a pair of signals on lines 64 and 66, attempting to select one of the addresses on lines 26, 28 and 30, if the programmer anticipates that an ordinary address is in order the anticipated condition signal on line 106 causes the signals on lines 64 and 66 to be overridden by a simulated increment signal thereby providing selection signals on lines 20 and 22 to select the ordinary address on line 24.

Even though the system has selected an address in accordance with the programmed anticipated condition that selection may not be correct if it is ultimately determined that a condition in the program has been met but was not anticipated by the programmer or alternatively that a condition in the program has not been met while the programmer believed it would be met. Under these last two sets of circumstances the system, during a period of time after the first 250 nanoseconds, compares the anticipated condition signal with a "test of the condition" signal and if there is not a match then the signals on lines 20 and 22 will be overridden and the "test of the condition" signal will be controlling.

In considering the circuitry to either effect or not effect an override by the "test of the condition" signal we find that there will be a zero or low signal on line 82 because it is a conditional microinstruction and the low signal on line 82 will be inverted by the inverter 84 to provide a first high signal to AND gate 86. Before we examine the other two inputs to AND gate 86 let us consider what the system does with respect to determining what the test results may be. The six bits 14 through 19 as found in FIG. 3 are transmitted on a cable 92 from the pipeline register 14 to the test circuitry means 80. In the test circuitry means 80 the six bits are decoded to select one of the lines generally labeled 96 which come from various parts of the system such as the adder (ALU 98) or some form of comparator, etc. If the program being executed generates a condition being sought, i.e. the test condition is valid, (for instance if the employee's year to date salary exceeds the minimum social security taxable amount) a high signal is provided on one of the lines 96 and that particular line is selected by the six bits on the cable 92. Under these conditions a high signal is transmitted on line 94. Of course if the condition has not been generated in the program at the time of the test then a low signal will appear on line 94. It is the comparison of the high or low signal on line 94 with the inverted programmable anticipated condition signal which determines whether the anticipated condition signal was correct or incorrect.

Now let us look at the situation at 250 nanoseconds where the programmer anticipated a jump address and provided a low signal from the anticipated condition bit field over line 106. This provides a high signal on line 110 to NAND gate 112. We will further assume that at 250 nanoseconds when the condition specified by the conditional jump microinstruction in pipeline register 14 becomes valid, a high signal is transmitted on line 94 indicating that the programmer was correct in selecting a jump address. Hence, we want no change to occur in the selection of an address on lines 20 and 22. Before 250 nanoseconds it will be remembered that the inputs to AND gate 86 are high on line 88, high on line 134 because of the low TP 250 signal at NAND gate 132 and low on line 114 because NAND gate 112 sees two high signals, line 110 and the output of NAND gate 116. NAND gate 116 is high because of the low TP 250 signal. This causes the selection of an address to be made from lines 64 and 66. At 250 nanoseconds the high output on line 94 and then on line 130 to NAND gate 132 coupled with the high TP 250 signal causes a low signal on line 134 to NAND gate 86 insuring that the output of AND gate 86 remains low. Hence, no new selection is made and the initially selected jump address remains in effect.

Let us consider the situation where the programmer has anticipated that there should be an ordinary address sought, that is, bit 23 in FIG. 3 is a one and thus a high signal would be found on line 106, and the output on line 94 is low at 250 nanoseconds indicating that the ordinary address was the one to be selected. In this situation there will be no change with respect to the high signal on line 88 to AND gate 86 because the microinstructions still indicates that it is a conditional instruction. There will be no change in the high signal on line 134 during the first 250 nanoseconds because the TP 250 signal is low. The high signal in line 106 passing through the inverter 108 provides a low signal to the AND gate 112. This in turn provides a high signal on line 114 to AND gate 86. Thus, before 250 nanoseconds AND gate 86 has three high inputs providing a high input to OR gates 68 and 70 thereby overriding the signals on lines 64 and 66. At 250 nanoseconds, the output on line 94 goes low and this is transmitted over line 130 to AND gate 132. This causes AND gate 132 to continue to put a high signal out on line 134. Since the input to AND gate 112 over line 110 remains low even after 250 nanoseconds the output of AND gate 112 over line 114 to AND gate 86 remains unchanged. Hence, AND gate 86 continues to see three high input signals after 250 nanoseconds and no new selection of an address is made. This is the desired result since the anticipated condition was the same as the tested condition after 250 nanoseconds.

Before describing the situations where the programmer erroneously anticipates the selection of a jump or ordinary address, the correction circuitry portion of the selection circuitry portion designated generally 78 will be described. The output of test circuitry 80 over line 94 is provided to NAND gate 132 over line 130 and to the exclusive OR gate 122. The output from inverter 108 is provided over line 120 to the exclusive OR gate 122. The output of exclusive OR gate 122 is provided to flip flop 126 and to NAND gate 116 over line 118. Flip flop 126 is a D flip flop which looks at the input on line 124 upon receipt of the TP 250 signal on line 123. The output of flip flop 126 is an extend cycle signal over line 128.

Now let us consider where the programmer anticipates a jump address should be sought but the test circuitry means 80 generates a low signal on line 94 at 250 nanoseconds, indicating that the test condition has not been met, that an ordinary address should have been selected. Under these circumstances, assuming all of the other circumstances to be the same, there would be a high signal on line 88 because of the low signal into inverter 84. There would be a high signal on line 134 before 250 nanoseconds because of the TP 250 signal. The low signal on line 106 would be inverted by inverter 108 to provide a high signal on line 110 to NAND gate 112. Because of the TP 250 signal on line 120 to NAND gate 116 a second high signal would be transmitted to NAND gate 112 over line 117. This results in a low signal to AND gate 86. A low signal at AND gate 86 allows signals on lines 64 and 66 to select an address in the address circuitry means 16. After 250 nanoseconds the output on line 94 and line 130 is low and the output of NAND gate 132 remains high. This continues to provide a high signal on line 134 to AND gate 86. The low signal on line 94 is compared with the high signal on line 120 in exclusive OR gate 122 to provide a high signal on line 124 and line 118. The high signal on line 118 to NAND gate 116 along with the high signal TP 250 after 250 nanoseconds provides a low signal on line 117. NAND gate 112 then changes to provide a high signal on line 114 to AND gate 86. AND gate 86 now has three high inputs and provides a high input to NOR gates 68 and 70 thereby overriding the signals on line 64 and 66 to select an ordinary address in the address circuitry means. Bear in mind that there are only 100 nanoseconds left in the current cycle. In order to provide time to wash out the instruction in the COS 12 and provide a new instruction therein, the high signal on line 124, described earlier, in combination with the TP 250 signal, transfers the flip flop 126 to its extend cycle side. In response thereto, there is an extend cycle signal transmitted on line 128, which halts the advance of the clock for 150 nanoseconds. During this 150 nanoseconds and the 100 nanoseconds remaining in the cycle time, the selector 18 selects the address on cable 24. The address on cable 24 is transmitted to the COS 12 and the instruction originally set up in the COS 12 in the first 250 nanoseconds of the cycle is replaced by an instruction residing at the ordinary address. At the end of the interrupt 150 nanoseconds, the cycle continues with the remaining 150 nanoseconds of the original cycle and the system finishes the execution of the instruction in pipeline register 14 and, thereafter, operates in response to the new instruction (from the ordinary address so selected).

Finally, let us consider that the programmer anticipated an ordinary instruction and the test circuitry 80 indicates that the test conditions for a jump address is met at 250 nanoseconds. Before 250 nanoseconds the signal on line 88 to AND gate 86 will be high as will the signal on line 134 as discussed earlier. If the programmer anticipates an ordinary address then the output of inverter 108 will be low to NAND gate 112 causing a high signal for line 114 to AND gate 86. AND gate 86 then provides a high signal to NOR gates 68 and 70 overriding the signals on line 64 and 66 and selecting the ordinary address in address circuitry means 16. At 250 nanoseconds, however, the output on line 94 is high and is provided to NAND gate 132 along with the high TP 250 signal. This provides a low signal over line 134 to AND gate 86 changing the output of AND gate 86 and, therefore, necessitating a change in the selection of an address of the next micoinstruction to be executed. At the same time, the high signal on line 94 is compared with the low signal on line 120 by exclusive OR gate 122 which provides a high signal on line 124 to flip flop 126. At 250 nanoseconds flip flop 126 provides an extend cycle signal over line 128 which operates as described above.

Figure 2:
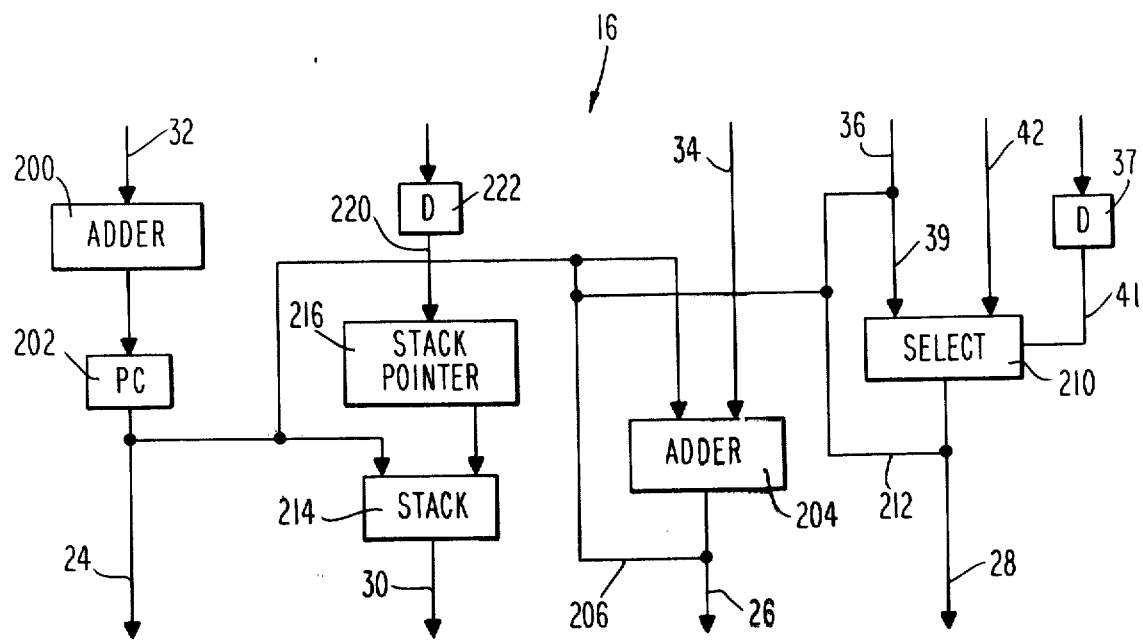
FIG. 2 is a more detailed block diagram of a portion of the block diagram of FIG. 1.

Address circuitry means 16 is shown in more detail in FIG. 2. The parallel 14 bit signal transmitted from selector 18 to COS 12 is returned to adder 200 of the address circuitry means 16 via line designated by line 32. Adder 200 is a combination of TTL 74S283 devices which increment the address received over line 32 by one and transmit it to program counter register 202 (a 74S174 device). The address stored in register 202 is the ordinary address (one more than the address currently being executed in pipeline register 14) and it is available to selector 18 as a parallel 14 bit address over parallel lines designated by the line 24.

One of the jump addresses formed by address circuitry means 16 is labelled a jump relative address. A jump relative address is defined to be no greater than the current address in the pipeline register 14 plus 4, or no less than the current address in pipeline register 14 minus 3. Jump relative addresses are formed by adding the three displacement field bits (bits 10–12 from a microinstruction currently being executed to pipeline register 14) to the 13 least significant bits of the contents of register 202 in adder 204. Adder 204 is a combination of 74S283 TTL devices. The most significant bit of the contents of register 202 does not pass through adder 204 but is provided separately over line 206 to be concatenated as the most significant bit with the output of adder 204 over parallel lines designated line 208 to form a jump relative address. The jump relative address is provided via parallel lines designated line 26 to selector 18.

Parallel designated lines 28 to selector 18 provide a second source for a jump address to selector 18. If the sequencer function bits, bits 47 and 48 in FIG. 3, are one and zero respectively then the jump address present on line 28 is a branch address or a bus address depending upon how it is formed. Parallel signals from the 13 bit address field (bits 0–12) of the microinstruction currently being executed in the pipeline register 14 are transmitted to address circuitry means 16 via lines designated by line 36.

In forming the branch address, the eight least significant bits are forwarded on parallel lines designated by line 39 in FIG. 2 to selector 210, a 74S258 TTL device, while the most significant 5 bits are concatenated with the most significant bit of the program counter 202. In forming the bus branch address, a second input to selector 210 is provided by 8 parallel bit signals from the control system output bus 40 over parallel lines designated by line 42 in FIG. 2. Either a branch address or a bus address is formed by selecting inputs over line 39 or the inputs over line 42 respectively and concatenating the six most significant bits formed above with the output of the selector 210. Selection is made by decoding the test condition bits 14–19 from the currently executed miroinstruction in pipeline register 14. The test condition bits are transmitted over parallel lines designated line 41 to the address circuitry means 16 and are decoded in that path by decoder 37. In the preferred embodiment, only one combination of bits 14–19 will provide selection of the branch address formed by selecting inputs 42.

Either a branch address or bus branch address as defined above is selected when the sequencer function bits, bits 47 and 48, are one and zero respectively. However, if the sequencer function bits are zero and one respectively, then the jump address formed is identical to the branch address but the sequencer function bits 47 and 48 are decoded in path 220 between pipeline register 14 and address circuitry means 16 by decoder 222 to cause the address stored in program counter 202 to be stored in a stack register 214. Stack register 214 is formed by a combination of Intel 3101 16×4 random access memories (RAM). This provides 16 possible locations for storing the address found in program counter 202. Stacked pointed circuitry 216 formed by a combination of a binary adder (a 74S283 device) and a 4 bit register (a 74S175 device), identifies which location will be used for storage. Each time that the sequencer function bits are decoded to store an address from program counter 202, the stack pointer is incremented by one by decoding the sequencer function bits.

A return address is a jump address formed by reading an address from the stack 214. This return address is transmitted over line 30 to selector 18. Lines 30 are selected by the selector control signals when the sequencer function bits, bits 47 and 48, are one and one. Whenever a return address is read from the stack 214 the stack pointer 216 is decremented by one.

In summary, an ordinary address is transmitted to selector 18 over line 24. Ordinary addresses come from program counter 202 in FIG. 2. Jump relative addresses are transmitted over lines 26 and are formed from the output of adder 204 over line 208 and the most significant bit from program counter 202 over line 206. Branch addresses, bus addresses, and call addresses are furnished over lines 28. They are formed from combining the output of selector 210 with the signals on lines 212. Return address, addresses stored in stack 214, are furnished over lines 30 to selector 18.

While the present invention has been disclosed in connection with the preferred embodiment thereof, it should be understood that there may be other embodiments which fall in the spirit and scope of the invention as defined by the following claims.

I claim:

1. A microprogrammed control system which is capable of simultaneously fetching and executing microinstructions during a cycle time of the control system, comprising:

a control store memory (COS) which stores at least one microprogram having at least one conditional address microinstruction and at least second and third microinstructions, said at least one conditional address microinstruction having a programmable test condition field and a programmable anticipated condition field;

a pipeline register means connected to said control store memory for receiving a microinstruction therefrom and formed to store a microinstruction to be executed;

address circuitry means connected to said pipeline register and said COS for forming an ordinary address of a microinstruction in said microprogram which is one greater than the address of said microinstruction stored in said pipeline register means, and for forming at least one conditional address of a microinstruction in said microprogram which is different from said ordinary address;

test circuitry means connected to said pipeline register means for testing one of a plurality of conditions present in said microprogram control system when said at least one conditional address microinstruction is stored in said pipeline register means, said test circuitry means operating in response to bit signals transmitted from said programmable test condition field;

selection circuitry means connected to said pipeline register means, said address circuitry means and said control store memory for selecting one of said addresses from said address circuitry means and for transmitting said address to said control store memory before said test circuitry means has completed said testing, whereby the result of testing by said test circuitry means is anticipated, said selection circuitry means operating in response to at least one bit signal transmitted from said programmable anticipated condition field when said at least one conditional address microinstruction is present in said pipeline register means;

said selection circuitry means further comprises correction circuitry connected to said test circuitry means for changing said selection of said address when the actual result of said testing by said test circuitry means is different from said anticipated result;

said conditional address microinstruction comprises a sequencer function field wherein said address circuitry means forms a plurality of conditional addresses of a plurality of microinstructions stored in said microprogram;

a selector in said selection circuitry connected to said address circuitry means and said control store memory, said selector responsive to selector control signals to transmit said selected one of said addresses to said control store memory;

gating circuitry connected to said selector;

sequencer circuitry connected between said pipeline register means and said gating circuitry for generating selector control signals to select said conditional address from said address circuitry means in response to bit signals transmitted from said sequencer function field; and anticipated condition circuitry connected between said pipeline register means and said gating circuitry for gating said selector control signals from said sequencer circuitry through said gating circuitry to said selector when said anticipated result calls for said conditional address, and for transmitting selector control signals to said selector to select and transmit said ordinary address in said address circuitry means to said control store memory when said anticipated result calls for an ordinary address.

2. The invention of claim 1 wherein said correction circuitry comprises cycle extension circuitry for extending the cycle time for execution of said microinstruction currently being executed when said anticipated result and said actual result of said test circuitry means differ.

* * * * *